Dec. 19, 1944.  F. L. ALBEN  2,365,505
VEHICLE DRIVE
Filed Sept. 18, 1942  2 Sheets-Sheet 1

WITNESSES:
C. J. Weller.

INVENTOR
Frank L. Alben.
BY
ATTORNEY

Dec. 19, 1944.   F. L. ALBEN   2,365,505
VEHICLE DRIVE
Filed Sept. 18, 1942   2 Sheets-Sheet 2

WITNESSES:

INVENTOR
Frank L. Alben.
BY
ATTORNEY

Patented Dec. 19, 1944

2,365,505

UNITED STATES PATENT OFFICE 2,365,505

VEHICLE DRIVE

Frank L. Alben, Pittsburgh, Pa., assignor to Westinghouse Electric & Manufacturing Company, East Pittsburgh, Pa., a corporation of Pennsylvania Application September 18, 1942, Serial No. 458,805

8 Claims. (Cl. 105—131)

My invention relates, generally, to vehicle drives and, more particularly, to flexible drives for electric locomotives.

Flexible drives of various types have been utilized on electric locomotives, one being a quill drive of the spring-cup type in which the torque of a driving motor is transmitted to the locomotive driving wheels through springs or other resilient members disposed in cups which engage wearing pads on the spokes of the wheels. The cups are carried by arms secured to a gear center or to a quill which surrounds the wheel axle. Flexible drives of the foregoing type necessarily contain a large number of wearing parts which are difficult to lubricate and cause heavy maintenance and replacement costs.

An object of my invention, generally stated, is to provide a flexible drive which shall be simple and efficient in operation and which may be economically manufactured and installed.

A more specific object of my invention is to provide a flexible drive having no wearing parts.

Another object of my invention is to provide a flexible drive of the quill type having ample flexibility for eccentricity of the axle with respect to the quill when operating over irregular track.

A further object of my invention is to cushion the driving motors of an electric locomotive from impact from the wheels when on rough track.

Other objects of my invention will be explained fully hereinafter or will be apparent to those skilled in the art.

In accordance with one embodiment of my invention, the driving torque is transmitted through a rubber disc vulcanized between two steel rings. The inner ring is pressed onto the axle adjacent one wheel and the outer ring is bolted to a gear rim and a flange on the quill which surrounds the axle. Either a single or a double-end quill drive may be utilized.

For a fuller understanding of the nature and objects of my invention, reference may be had to the following detailed description, taken in conjunction with the accompanying drawings, in which.

Figure 1:
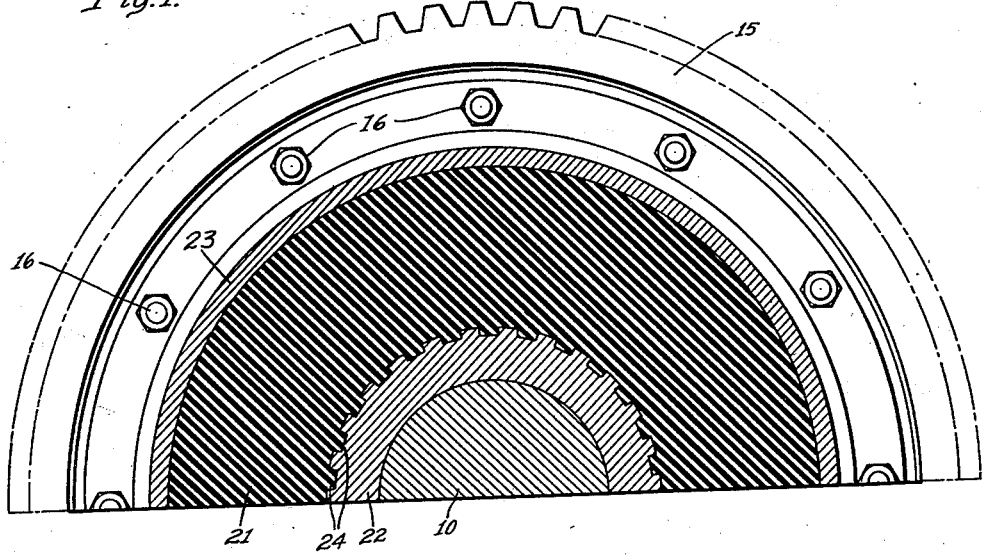
Figure 1 is a view, partially in elevation and partially in section, of a portion of a flexible drive embodying my invention; the section being taken along the line I—I of Fig. 2.
Figure 2:
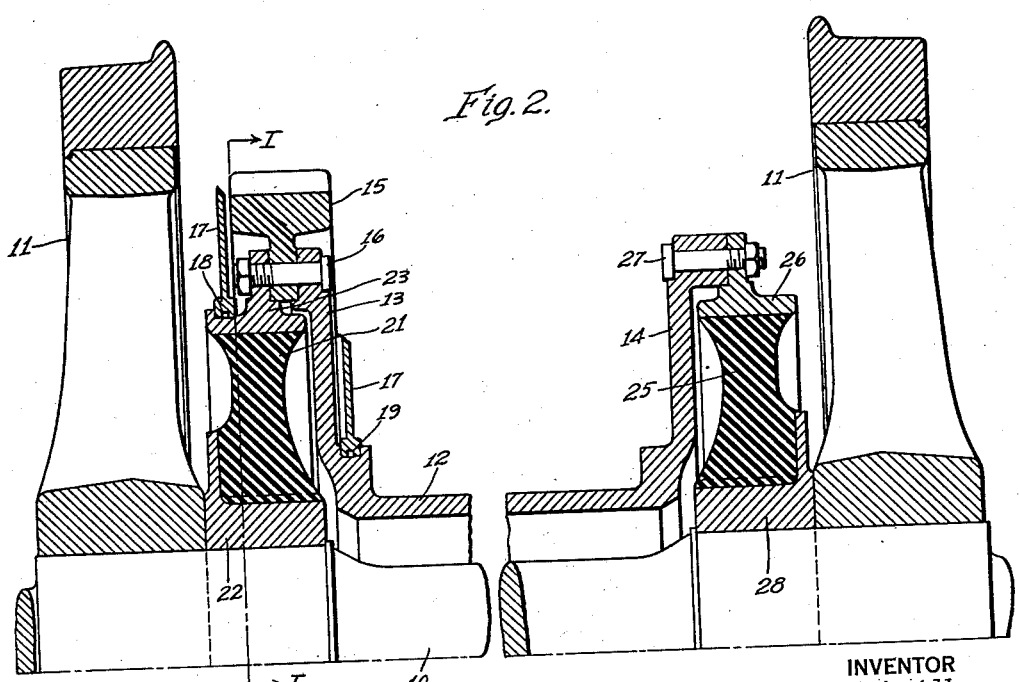
Fig. 2 is a view, in longitudinal section, of a portion of the vehicle drive.

Referring to the drawings, and particularly to Figs. 1 and 2, the structure shown therein comprises a wheel axle 10 on which wheels 11 are secured in the usual manner. A quill 12 surrounds the axle 10 and a motor (not shown) may be mounted on the quill in the usual manner, the quill being rotatably mounted in bearings provided in the motor. The quill 12 is provided with an annular flange 13 at one end and a similar flange 14 at the other end of the quill. A gear rim 15 may be secured to the flange 13 by a plurality of bolts 16. In this manner the gear 15 and the quill 12 may be driven by a pinion mounted on the armature shaft of the motor. A gear case 17 may be provided for enclosing the gear 15 to protect the gear and the pinion. Gear-case seals 18 and 19 are provided to retain a lubricant within the gear housing.

In order to transmit torque from the motor to the axle and to provide ample flexibility for eccentricity of the axle with respect to the quill when operating on irregular track, the flange 13 of the quill and the gear rim 15 are connected to the axle by means of a resilient ring 21 which is preferably composed of rubber or a similar resilient material. The ring 21 surrounds the axle 10 and its inner periphery is vulcanized to a metal ring 22 which may be pressed onto the axle. The outer periphery of the ring 21 is vulcanized to a metal ring 23 which is secured to the flange 13 and the gear rim 15 by the bolts 16. The inner ring 22 is preferably of an L-shape and is provided with a plurality of slots 24 to increase the bond area for the rubber to keep the load on the bond as low as possible per unit area.

It will be seen that the motor torque is transmitted through the gear rim 15, the outer ring 23, the resilient ring 21 and the inner ring 22 to the axle 10 and thus to the wheels 11, thereby resiliently transmitting the motor torque and also providing flexibility between the quill 12 and the axle 10. Furthermore, the rubber ring 21, disposed between the axle and the quill, will cushion the motor from impact from the wheels.

As illustrated, a ring 25, similar to the ring 21, is provided for connecting the flange 14 of the quill 12 to the axle 10. The outer periphery of the ring 25 is vulcanized to a ring 26, which is secured to the flange 14 by bolts 27. The inner periphery of the ring 25 may be vulcanized to a ring 28 which may be pressed onto the axle 10 in a manner similar to the ring 22. Thus the ring 25 also transmits torque from the quill 12 to the axle 10, which is driven from both ends of the quill. If only a single-end drive is desired, the ring 25 and the flange 14 on the quill 12 may be omitted from the structure.

It will be noted that the ring 21 occupies space formerly required by the gear hub in drives of previous construction. Therefore, the present flexible drive requires no additional space and does not necessitate any change in the construction of the motor. It will also be seen that the present drive is extremely simple in structure and has a small number of parts as compared with flexible drives of previously known types. Furthermore, there are no wearing or rubbing parts between the drive and the wheels, thereby eliminating the necessity for lubricating the wearing parts and reducing the maintenance cost, since there are no wearing parts which require replacement. The wheels 11 may also be interchangeable for each end of the axle, since the drive is not connected to either wheel but is connected directly to the axle.

Figure 3:
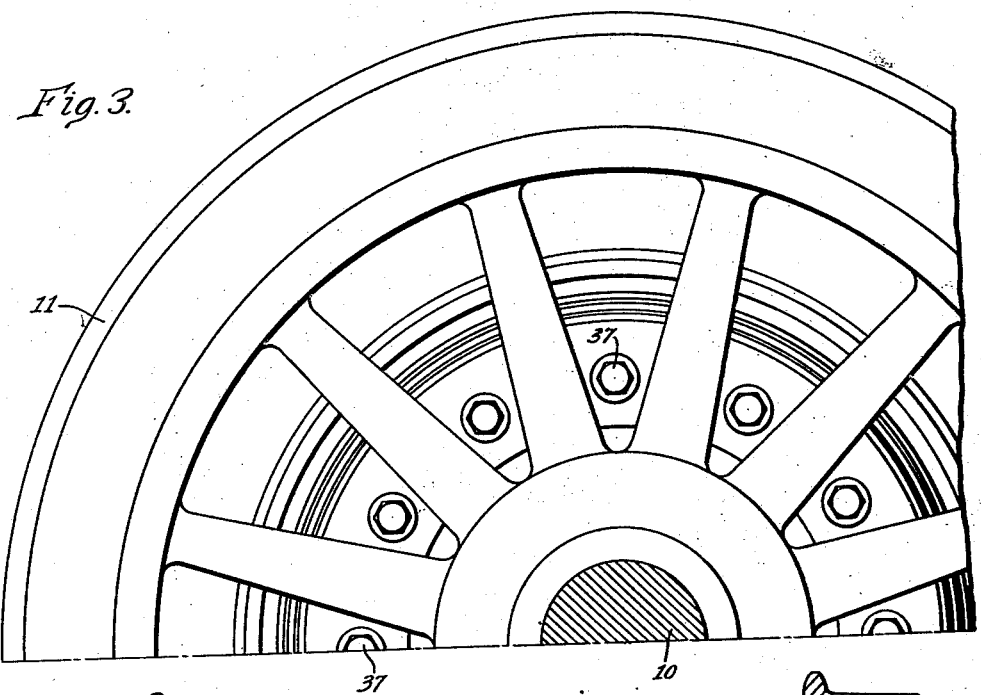
Fig. 3 is a view, in end elevation, of a modification of the structure shown in Figs. 1 and 2.
Figure 4:
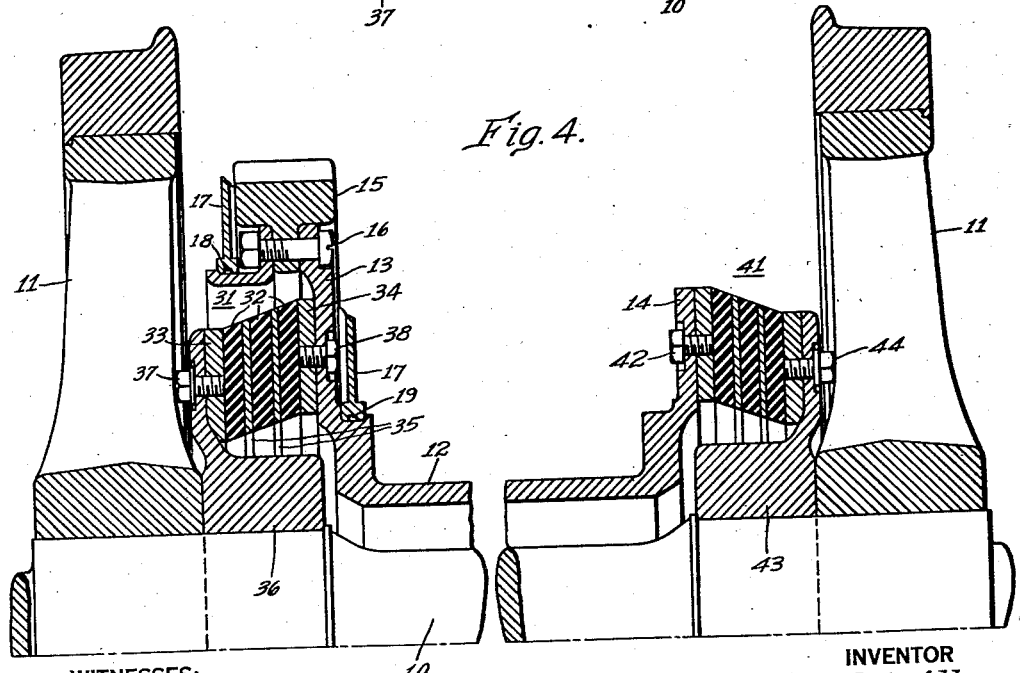
Fig. 4 is a view, in section, of the modified structure.

In the modification of the invention illustrated in Figs. 3 and 4, in which like parts are designed by the same reference characters as in Figs. 1 and 2, the flange 13 of the quill 12 is connected to the axle 10 by a flexible member 31 comprising a plurality of resilient discs 32 disposed between metal end plates 33 and 34 and separated by metal discs 35, all of which surround the axle 10. The outer rubber discs 32 may be vulcanized to the end plates 33 and 34 and to the metal discs 35. Likewise, the inner disc 32 is vulcanized to the metal discs 35, thereby providing a flexible member capable of transmitting a large amount of torque.

The end plate 33 may be bolted to a flanged ring 36 by a plurality of bolts 37. The ring 36 may be pressed onto the axle 10 in a manner similar to the ring 22, as hereinbefore described. The end plate 34 may be secured to the flange 13 of the quill 12 by a plurality of bolts 38. In this manner torque may be transmitted between the quill 12 and the axle 10. Furthermore, the desired flexibility for eccentricity of the axle with respect to the quill is provided.

As in the structure illustrated in Figs. 1 and 2, a double-end drive may be provided by connecting the flange 14 of the quill 12 to the axle 10 by a resilient member 41 which is similar in structure to the member 31. The member 41 may be bolted to the flange 14 by bolts 42 and to a flanged ring 43 by bolts 44. The ring 43 is pressed onto the axle in a manner similar to the ring 36. As explained hereinbefore, the flexible member 41 and the flange 14 may be omitted if only a single-end drive is desired.

From the foregoing description, it is apparent that I have provided a flexible drive which is extremely simple in construction, thereby making it easy to manufacture and assemble. Furthermore, there are no wearing parts in the present drive which require lubrication and, possibly, replacement. The present drive not only provides for resiliently transmitting torque but also provides a resilient mounting for the motor of an electrically propelled vehicle, thereby preventing breakage of the motor supports. The drive herein described also provides ample flexibility for movement of the axle with respect to the quill when the vehicle is operating on irregular track. The present drive may be utilized with motors of either the single or twin type, which are now being utilized for propelling electric locomotives. Since the drive requires no additional space, the design of the motors does not need to be changed to utilize the present drive.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a vehicle drive mechanism, in combination, a wheel axle, a rotatable quill surrounding the axle, a flange on the quill, a gear rim secured to the flange, a ring of resilient material surrounding the axle and removably secured to said flange for connecting the quill to the axle, and means concentric with the resilient rings for securing said resilient ring to the axle, said resilient ring and said securing means being disposed substantially within said gear rim.

2. In a vehicle drive mechanism, in combination, a wheel axle, a rotatable quill surrounding the axle, a flange on the quill, a gear rim secured to the flange, a ring of resilient material surrounding the axle for connecting the quill to the axle, means concentric with the resilient ring for securing said resilient ring to the axle, and means for removably securing the resilient ring to said flange, said flange and said resilient ring being disposed substantially within said gear rim.

3. In a vehicle drive mechanism, in combination, a wheel axle, a rotatable quill surrounding the axle, a flange on the quill, a gear rim secured to the flange, a ring of resilient material surrounding the axle for connecting the quill to the axle, means concentric with the resilient ring for securing said resilient ring to the axle, and means for removably securing the resilient ring to said flange, said resilient ring and said securing means being disposed substantially within said gear rim.

4. In a vehicle drive mechanism, in combination, a wheel axle, a rotatable quill surrounding the axle, an annular flange on the quill, a gear rim secured to the flange, a plurality of coaxial rings of resilient material for connecting the quill to the axle, and flanged means surrounding the axle for securing said rings to the axle, said rings being disposed between the flange on the quill and said flanged means and substantially within said gear rim.

5. In a vehicle drive mechanism, in combination, a wheel axle, a rotatable quill surrounding the axle, an annular flange on the quill, a gear rim secured to the flange, a plurality of coaxial rings of resilient material for connecting the quill to the axle, flanged means surrounding the axle for securing said rings to the axle, and means surrounding the axle for securing the rings to the flanges, said rings being disposed substantially within said gear rim.

6. In a vehicle drive mechanism, in combination, a wheel axle, a rotatable quill surrounding the axle, an annular flange on the quill, a gear rim secured to the flange, a plurality of coaxial rings of resilient material surrounding the axle for connecting the quill to the axle, flanged means disposed between the rings and the axle for securing the rings to the axle, and means surrounding the axle for securing said rings to the flanges, said rings being disposed substantially within said gear rim.

7. In a vehicle drive mechanism, in combination, a wheel axle, a rotatable quill surrounding the axle, an annular flange on the quill, a gear rim secured to the flange, and means comprising a plurality of metal discs having resilient material secured therebetween and coaxially disposed around the axle for resiliently connecting the quill to the axle, said discs being disposed substantially within said gear rim.

8. In a vehicle drive mechanism, in combination, a wheel axle, a rotatable quill surrounding the axle, an annular flange on the quill, a gear rim secured to the flange, and means comprising a plurality of metal and resilient discs secured together and coaxially disposed around the axle for resiliently connecting the quill to the axle, said discs being disposed substantially within said gear rim.

FRANK L. ALBEN.